(12) United States Patent
Garvick

(10) Patent No.: US 6,394,726 B1
(45) Date of Patent: May 28, 2002

(54) THREADED FASTENER

(75) Inventor: James E. Garvick, New Lenox, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/584,310

(22) Filed: May 31, 2000

(51) Int. Cl.[7] .................................................. F16B 35/04
(52) U.S. Cl. ........................................ 411/414; 411/411
(58) Field of Search ................................ 411/411, 414, 411/310, 311, 387.4

(56) References Cited

U.S. PATENT DOCUMENTS

| | | |
|---|---|---|
| 2,350,346 A | 6/1944 | Gaskell |
| 2,827,820 A | 3/1958 | De Vellier |
| 3,323,402 A * | 6/1967 | Gowen ..................... 411/411 |
| 3,748,949 A * | 7/1973 | Dreger ..................... 411/411 |
| 3,942,405 A | 3/1976 | Wagner |
| 3,965,793 A | 6/1976 | Roser |
| 4,536,117 A | 8/1985 | Yamashiro |
| 4,850,775 A * | 7/1989 | Lee ........................... 411/411 |
| 5,304,023 A * | 4/1994 | Toback ...................... 411/414 |
| 5,863,167 A | 1/1999 | Kaneko |
| 5,882,162 A | 3/1999 | Kaneko |
| 6,000,892 A | 12/1999 | Takasaki |
| 6,158,939 A * | 12/2000 | Grossberndt ............... 411/411 |

FOREIGN PATENT DOCUMENTS

| | | | | |
|---|---|---|---|---|
| DE | 3615271 | * | 11/1987 | ............... 411/411 |
| WO | WO99/06715 | * | 2/1999 | |

* cited by examiner

Primary Examiner—Flemming Saether
(74) Attorney, Agent, or Firm—Fletcher, Yoder & Van Someren

(57) ABSTRACT

A threaded fastener having a shaft with a screw thread disposed thereabout, a pressure flank of the screw thread having a first pressure flank angle on a radial inner portion thereof and a second pressure flank angle on a radial outer portion thereof, the first pressure flank angle less than the second pressure flank angle. The fastener is preferably embodied as a screw fastener with a relatively small gimlet angle.

20 Claims, 2 Drawing Sheets

THREADED FASTENER

BACKGROUND OF THE INVENTION

The invention relates generally to threaded fasteners, and more particularly to screw thread configurations therefor and combinations thereof.

Threaded fasteners having relatively low pressure flank angles are known generally, as disclosed for example in U.S. Pat. No. 2,827,820 entitled "Self-Tapping Screws".

An object of the present invention is to provide novel threaded fasteners and screw thread configurations therefor that improve upon and overcome problems in the art.

Another object of the invention is to provide novel threaded fasteners and screw thread forms therefor that are reliable and economical.

A further object of the invention is to provide novel threaded fasteners and screw thread configurations therefor having improved performance and manufacturability.

Another object of the invention is to provide novel threaded fasteners and screw thread forms therefor having improved strip torque and pull-out strength.

Another object of the invention is to provide novel threaded fasteners having relatively low driving torques.

Yet another object of the invention is to provide novel threaded fasteners and thread configurations therefor having both improved strip torque and pull-out strength characteristics and relatively low driving torques.

Still another object of the invention is to provide novel case hardened threaded fasteners having improved strip torque and pull-out strength characteristics.

Another object of the invention is to provide novel threaded fasteners having improved strip torque and pull-out strength, some of which that may be manufactured using conventional thread forming processes.

A more particular object of the invention is to provide novel threaded fasteners comprising a shaft having a screw thread with a pressure flank disposed about at least a portion thereof, the pressure flank having a first pressure flank angle on a radial inner portion thereof and a second pressure flank angle on a radial outer portion thereof, the first pressure flank angle between approximately 5 degrees and approximately 10 degrees, the second pressure flank angle greater than the first pressure flank angle.

Another more particular object of the invention is to provide novel screw thread forms comprising a screw thread having a pressure flank with a first pressure flank angle on a radial inner portion thereof and a second pressure flank angle on a radial outer portion thereof, the first pressure flank angle less than the second pressure flank angle.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
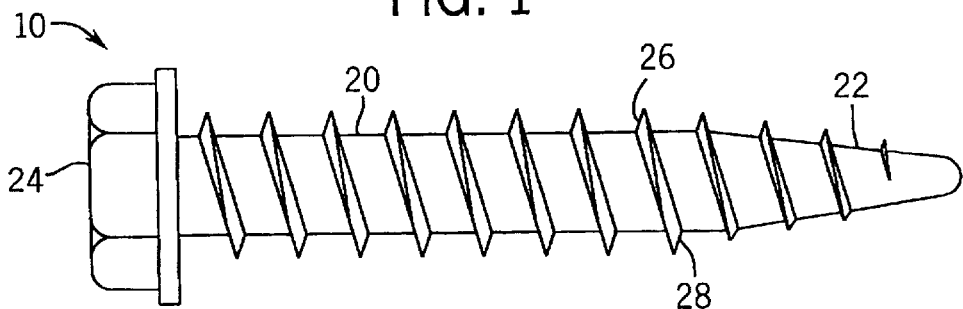
FIG. 1 is a plan view of an exemplary threaded fastener.

FIG. 1 illustrates an exemplary threaded fastener 10 in the form of a screw fastener comprising generally a threaded shaft 20 having a leading end portion 22 and a head 24 on an end thereof opposite the leading end portion.

In the exemplary screw fastener application, the leading end portion of the shaft 20 is tapered with a gimlet angle of approximately 26 degrees, but other screw fastener applications may have other gimlet angles and other leading end portion configurations.

In FIG. 1, the shaft 20 has a screw thread disposed generally helically and at least partially thereabout. The screw thread includes a pressure flank 26 which is usually disposed toward the screw head or driving end of the fastener, and a non-pressure flank, otherwise referred to herein as a trailing flank, 28 which is usually disposed toward the leading end portion thereof.

Figure 2:
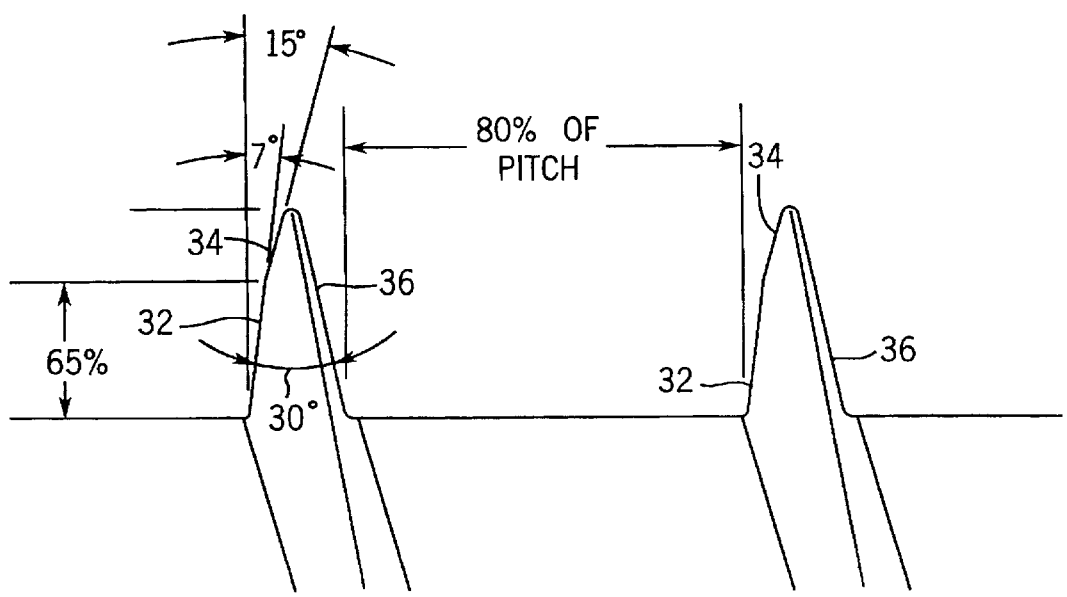
FIG. 2 is a partial plan view of an exemplary screw thread form, according to the present invention.

In FIG. 2, the pressure flank of the screw thread includes a first pressure flank angle on a radial inner portion 32 thereof and a second pressure flank angle on a radial outer portion 34 thereof. The first pressure flank angle is preferably less than the second pressure flank angle.

In the illustrated embodiment, the second pressure flank angle on the radial outer portion 34 of the screw thread is approximately twice the pressure flank angle on the radial inner portion 32 thereof. This relation however is only exemplary and is not intended to be limiting, since the particular relation between the pressure flank angles is application specific.

The first pressure flank angle is preferably between approximately 5 degrees and approximately 10 degrees, and in one application is approximately 7 degrees. The second pressure flank angle is preferably between approximately 10 degrees and approximately 30 degrees, and in one application is approximately 15 degrees.

The exemplary pressure flank angles herein are measured from a reference transverse to the shaft axis. The first and second pressure flank angles may be more or less than the exemplary ranges disclosed herein, which are not intended to limit the invention.

The farther the first pressure flank angle extends radially from the shaft, the better the pull-out strength and stripping torque performance. But this results in thinner and thus weaker radial outer thread portions, and makes more difficult the manufacture of the thread with conventional forming process.

In the illustrated embodiment, the first pressure flank angle extends radially from the shaft to approximately 65 percent of the thread depth, but this percentage may be more or less depending on performance requirements.

In the embodiment illustrated in FIG. 2, the screw thread has an angle of approximately 30 degrees measured between the second pressure flank angle on the radial outer portion 34 of the pressure flank and the trailing flank 28 of the screw thread. In the embodiment illustrated in FIG. 3, the screw thread has an angle of approximately 45 degrees measured between the second pressure flank angle on the radial outer portion 34 of the pressure flank and the trailing flank 28 of the screw thread.

Decreasing the minor thread diameter and/or increasing the angle between the pressure flank and the trailing flank corresponds generally to decreasing axial spacing between the pressure flank and trailing flank of adjacent screw thread portions. Conversely, increasing the minor thread diameter and/or decreasing the angle between the pressure flank and the trailing flank corresponds generally to increasing axial spacing between the pressure flank and trailing flank of adjacent screw thread portions.

Figure 3:
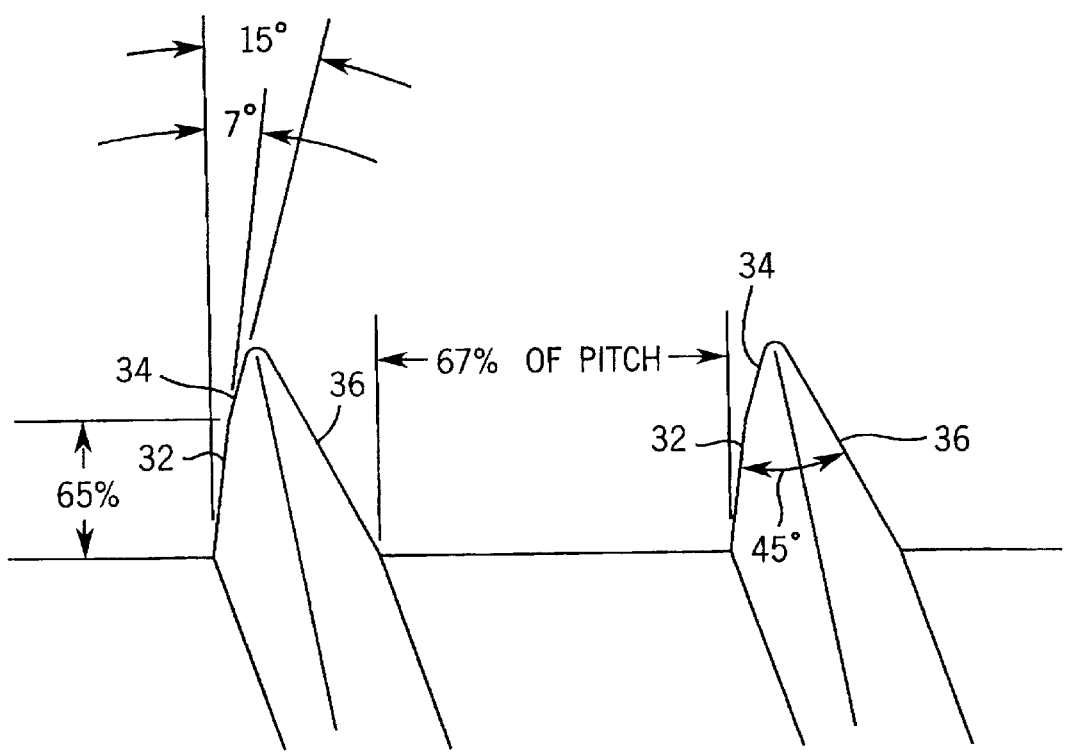
FIG. 3 is a partial plan view of an alternative exemplary screw thread form, according to the present invention.

In the embodiment illustrated in FIG. 3, where the angle between the second pressure flank angle on the radial outer portion of the pressure flank and the trailing flank of the screw thread is approximately 45 degrees, the axial spacing between the pressure flank and the trailing flank of adjacent screw thread portions is approximately 67 percent of screw thread pitch. In the embodiment illustrated in FIG. 2, where the angle between the second pressure flank angle on the radial outer portion of the pressure flank and the trailing flank of the screw thread is approximately 30 degrees, the axial spacing between the pressure flank and the trailing flank of adjacent screw thread portions is approximately 80 percent of screw thread pitch. The particular relation between the referenced angle and axial spacing however is application specific, and thus the exemplary configurations disclosed herein are not intended to limit the invention.

The radial outer portion of the screw thread may be made less thin, in other words thickened, by increasing the second pressure flank angle on the radial outer portion of the pressure flank and/or by reducing the extent to which the radial inner portion of the pressure flank extends from the shaft.

In some embodiments, the threaded fastener is case hardened. And in some applications, especially those in which case hardening is desired, it may be desirable to provide a relatively wide angle between the second pressure flank angle on the radial outer portion 34 of the pressure flank and a trailing flank 28 of the screw thread, for example greater than 30 degrees, and/or to increase the second pressure flank angle thereby increasing thread thickness, particularly at the radial outer portion thereof, which will prevent or at least reduce any brittleness that may result from case hardening.

The screw thread configurations or forms of the present invention are not limited to screw fastener applications but are applicable more generally to any shaft or body member having a screw thread disposed at least partially thereabout.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A threaded fastener comprising:
   a shaft having a leading end portion and a head on a trailing end portion thereof, and
   a screw thread having a pressure flank and a trailing flank disposed about at least a portion of the shaft,
   the pressure flank having a first pressure flank angle on a radial inner portion thereof and a second pressure flank angle on a radial outer portion thereof,
   the first pressure flank angle being between approximately 5 degrees and approximately 10 degrees,
   the second pressure flank angle being greater than the first pressure flank angle, and
   the trailing flank having a rectilinear form having no inflection between the shaft and a tip of the thread, the trailing flank having a trailing flank angle greater than the first pressure flank angle and at least as great as the second pressure flank angle.

2. The fastener of claim 1, the second pressure flank angle on the radial outer portion of the pressure flank is approximately twice the pressure flank angle on the radial inner portion thereof.

3. The fastener of claim 1, the first pressure flank angle is approximately 7 degrees, and the second pressure flank angle is approximately 15 degrees.

4. The fastener of claim 1, the first pressure flank angle extends radially from the shaft to approximately 65 percent of thread depth.

5. The fastener of claim 1, the screw thread has an angle of approximately 45 degrees between the radial outer portion of the pressure flank and the trailing flank of the screw thread.

6. The fastener of claim 5, an axial spacing between the pressure flank and the trailing flank of adjacent screw thread portions is approximately 67 percent of screw thread pitch.

7. The fastener of claim 1, the screw thread has an angle of approximately 30 degrees between the radial outer portion of the pressure flank and the trailing flank of the screw thread.

8. The fastener of claim 7, an axial spacing between the pressure flank and the trailing flank of adjacent screw thread portions is approximately 80 percent of screw thread pitch.

9. The fastener of claim 7 is case hardened.

10. The fastener of claim 1, the leading end portion of the shaft is tapered with a gimlet angle of approximately 26 degrees.

11. A screw thread form comprising:
    a screw thread having a pressure flank and a trailing flank,
    the pressure flank having a first pressure flank angle on a radial inner portion of the screw thread,
    pressure flank having a second pressure flank angle on a radial outer portion of the screw thread,
    the first pressure flank angle being less than the second pressure flank angle,
    the trailing flank having a rectilinear form having no inflection between the shaft and a tip of the thread, the trailing flank having a trailing flank angle greater than the first pressure flank angle and at least as great as the second pressure flank angle.

12. The thread form of claim 11, the first pressure flank angle extends outwardly from the shaft to approximately 65 percent of thread depth.

13. The thread form of claim 12, the first pressure flank angle between approximately 5 degrees and approximately 10 degrees.

14. The thread form of claim 13, the second pressure flank angle is approximately 15 degrees.

15. The thread form of claim 11, the second pressure flank angle approximately twice the first pressure flank angle.

16. The thread form of claim 11, the screw thread has an angle of approximately 30 degrees between the second pressure flank angle and the trailing flank of the screw thread.

17. The thread form of claim 16, an axial spacing between the pressure flank and the trailing flank of adjacent screw thread portions is approximately 80 percent of screw thread pitch.

18. The thread form of claim 11, the screw thread has an angle of approximately 45 degrees between the second pressure flank angle and the trailing flank of the screw thread.

19. The thread form of claim 18, an axial spacing between the pressure flank and the trailing flank of adjacent screw thread portions is approximately 67 percent of screw thread pitch.

20. The thread form of claim 18 is case hardened.

* * * * *